No. 882,134. PATENTED MAR. 17, 1908.
M. E. WOODARD.
WRAPPER FOR FRUITS.
APPLICATION FILED JUNE 11, 1906.
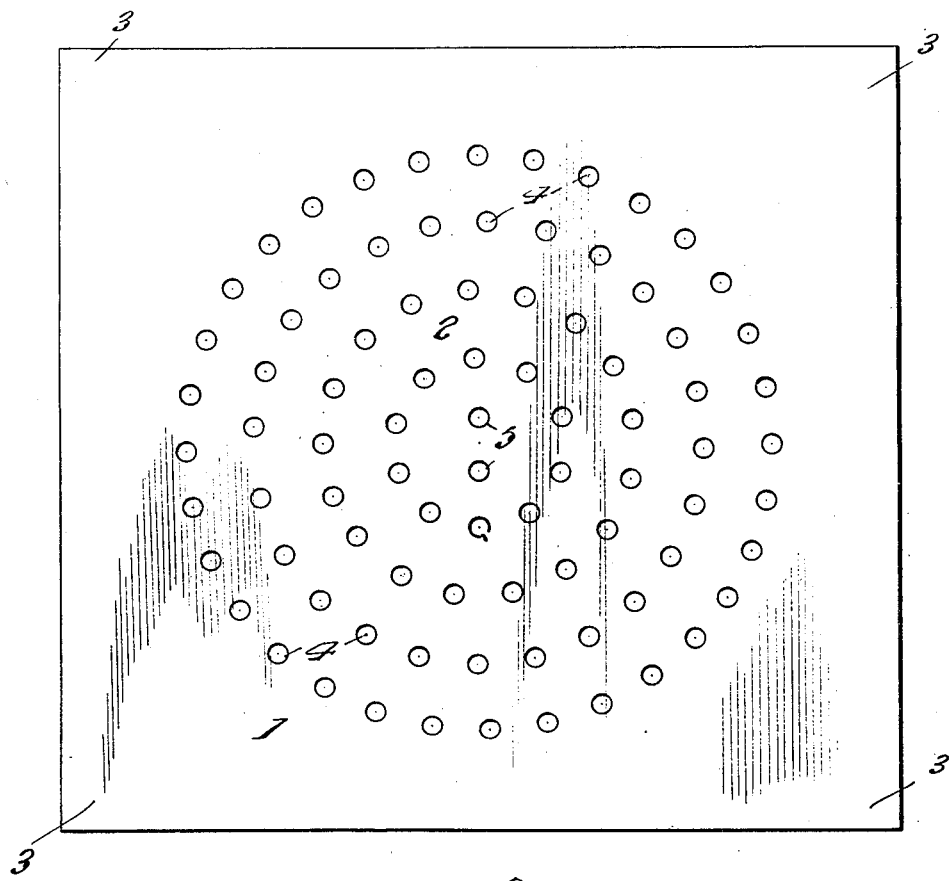
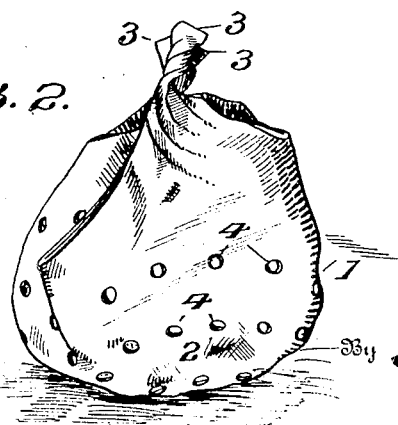
Inventor
M. E. Woodard.

UNITED STATES PATENT OFFICE.

MINERVA E. WOODARD, OF FOLSOM, CALIFORNIA.

WRAPPER FOR FRUITS.

No. 882,134.  Specification of Letters Patent.  Patented March 17, 1908.

Application filed June 11, 1906. Serial No. 321,298.

*To all whom it may concern:*

Be it known that I, MINERVA E. WOODARD, citizen of the United States, residing at Folsom, in the county of Sacramento and State of California, have invented certain new and useful Improvements in Wrappers for Fruits, of which the following is a specification.

The present invention relates to improvements in the packing of fruit or similar commodities for purposes of shipping or storage. Where fruit is intended for shipping, it is ordinarily wrapped in a sheet of paper which forms a protective covering and prevents the fruit from being bruised or otherwise injured so as to detract from its market value. This practice is objectionable, however, since the paper covering shuts off the air and brings about conditions highly favorable to rapid decay. This objection is overcome in the present invention by providing the wrapper with a perforate portion which surrounds the fruit and enables the air to circulate freely therearound in such a manner as to retard decomposition.

For a full description of the invention and the merits thereof and also to acquire a knowledge of the details of construction of the means for effecting the result, reference is to be had to the following description and accompanying drawings, in which:

Figure 1 is a plan view of the improved fruit wrapper; and Fig. 2 is a view showing the wrapper applied.

Corresponding and like parts are referred to in the following description and indicated in all the views of the drawings by the same reference characters.

The wrapper is in the form of a sheet of thin flexible material 1, such as paper, which is provided with a perforate portion 2 surrounding the fruit and with twisting tabs 3 exterior to the perforate portion by means of which the wrapper is held in position upon the fruit. In the preferred construction, the wrapper is rectangular in shape, as shown in the drawings, and the perforations 4 are arranged in a series of concentric rings in the central portion of the wrapper, a pair of openings 5 being shown in the present instance, as located within the inner concentric ring. Where a rectangular sheet is employed for the wrapper, the corners 3 which are exterior to the perforate portion form the tabs which are adapted to be twisted together after the wrapper has been placed upon the fruit. With this construction, it will be apparent that the concentric rings or perforations will form annular bands about the body of the fruit and will permit a free circulation of the air, both through the crate and around the crate, and in this manner tend to preserve the fruit and retard decay.

Having thus described the invention, what is claimed as new is:

1. A wrapper for fruit or similar commodities comprising a sheet of thin flexible material having its central portion provided with perforations to permit a free circulation of air about the fruit and having tabs arranged about the perforated portion to be twisted together to secure the wrapper after being fitted about the fruit.

2. A wrapper for fruit or similar commodities comprising a sheet of thin flexible material having its central portion provided with perforations to permit a free circulation of air, and having imperforate projecting portions exterior to the centrally perforated portion to form tabs for securing the wrapper in position upon the fruit.

3. A new article of manufacture, a wrapper for fruit, or the like, comprising a rectangular sheet of thin paper having its central portion provided with a series of concentric perforations forming annular bands around the fruit to permit a free circulation of air and having the corners of the rectangular sheet imperforated and constituting tabs for securing the wrapper about the fruit by twisting the said corner tabs together.

In testimony whereof I affix my signature in presence of two witnesses.

MINERVA E. WOODARD. [L. S.]

Witnesses:
 J. H. BURNHAM,
 GEO. MCMANUS.